Patented June 7, 1949

2,472,168

UNITED STATES PATENT OFFICE 2,472,168

PROCESS FOR THE PREPARATION OF D-GLUCOSACCHARIC ACID

Charles L. Mehltretter, Carl E. Rist, and Benjamin H. Alexander, Peoria, Ill., assignors to the United States of America as represented by the Secretary of Agriculture No Drawing. Application October 12, 1948, Serial No. 54,192

1 Claim. (Cl. 260—528)

(Granted under the act of March 3, 1883, as amended April 30, 1928; 370 O. G. 757)

This application is made under the act of March 3, 1883, as amended by the act of April 30, 1928, and the invention herein described, if patented in any country, may be manufactured and used by or for the Government of the United States of America for governmental purposes throughout the world without the payment to us of any royalty thereon.

This invention relates to the preparation of D-glucosaccharic acid and has among its objects the production of said acid by the catalytic oxidation of dextrose.

We have discovered that glucose or its commercial form, dextrose hydrate, may be oxidized by gases containing oxygen in the presence of a platinum catalyst and that it is advantageous to conduct the reaction under conditions of vigorous agitation.

The agency of oxidation may be any gas containing oxygen in appreciable amounts, such as atmospheric air, gaseous oxygen or mixtures of gaseous oxygen with other gases inert to the reaction mixture. As catalysts, we employ platinum, preferably platinum black either alone or supported by such materials as activated carbon, alumina, asbestos, or the like. For convenience, we prefer to employ a platinum-black-activated carbon catalyst.

The reaction should preferably be carried out at a hydrogen ion concentration of pH 5.0 to pH 9.6 or above. This is accomplished by adjusting the pH when necessary by adding a basic compound. This base is conveniently an alkali metal compound, such as a hydroxide, carbonate, oxide and the like. It is preferable to use potassium bicarbonate and with this procedure the desired acid may be conveniently recovered as its potassium salt.

The free acid may be recovered from the alkali metal salt by known methods. For example, the free acid may be recovered from an aqueous solution of its alkali metal salt by the addition of the theoretical amount of mineral acid, evaporation to dryness and extraction of the D-glucosaccharic acid with an alcohol such as methanol. It is preferable, however, to convert the alkali metal salt to the insoluble calcium salt and subsequently remove the calcium ions by oxalic or sulfuric acid to yield D-glucosaccharic acid.

The following example illustrates the invention.

Example

A solution was prepared of 29.7 g. of dextrose hydrate in 500 ml. of distilled water. To this solution was added 15 g. of potassium bicarbonate dissolved in 500 ml. of water. The catalyst was then added, consisting of 6.8 g. of a platinum-activated carbon catalyst (10 percent platinum). The reaction was carried out with the addition of 112 l. of air per hour, the temperature was maintained at about 50° C. and the reaction mixture was stirred vigorously. After approximately one hour, the pH of the solution dropped to 5.7. Fifteen grams of potassium bicarbonate was then added and the reaction continued with vigorous stirring for a total of 12½ hours. At the end of this period, the pH of the solution was 7.1. The catalyst was then removed by filtration and the clear amber colored solution concentrated in vacuo to 300 ml. Sufficient concentrated potassium hydroxide solution was added to adjust the pH of the solution to 9 to convert any lactones present to soluble potassium salts.

Potassium acid D-glucosaccharate was crystallized by the addition of 50 ml. of glacial acetic acid. The pH of the crystallization medium was 3.8. The mixture was cooled to 10° C., filtered and the separated crystals washed with 30 percent ethanol. The product consisted of a white crystalline material which was subsequently dried at 40° C. to constant weight. It consisted of pure potassium acid D-glucosaccharate (21.0 g., 54 per cent of theory).

Anal.: Calc'd. Neutral equivalent 248.2; found: 247.9. Calc'd. K: 15.7 percent; found: 15.8 percent.

The free acid may be recovered from an aqueous solution of the potassium salt by adding the theoretical amount of calcium chloride, crystallizing, redissolving, and removing the calcium by means of the theoretical amount of oxalic acid.

We claim:

A method which comprises oxidizing glucose in aqueous medium by means of an oxygen-containing gas, in the presence of a platinum catalyst and under vigorous agitation, the hydrogen ion concentration being maintained during the reaction within the range pH 5.0 to 9.6 by the addition of a basic potassium salt and recovering the D-glucosaccharic acid as the water-insoluble potassium acid D-glucosaccharate.

CHARLES L. MEHLTRETTER.
CARL E. RIST.
BENJAMIN H. ALEXANDER.

REFERENCES CITED

The following references are of record in the file of this patent:

UNITED STATES PATENTS

| Number | Name | Date |
| --- | --- | --- |
| 2,189,778 | Dalmer et al. | Feb. 13, 1940 |